(12) United States Patent
Shimpi et al.

(10) Patent No.: US 7,653,195 B2
(45) Date of Patent: Jan. 26, 2010

(54) APPARATUS, SYSTEM, AND METHOD FOR DISPOSING OF A CALL

(75) Inventors: Anirudha Shimpi, South Jordan, UT (US); John Sirstins, Salt Lake City, UT (US); Forest Baker, III, Salt Lake City, UT (US); Forest Baker, IV, Murray, UT (US)

(73) Assignee: Noguar, L.C., Murray, UT (US)

( * ) Notice: Subject to any disclaimer, the term of this patent is extended or adjusted under 35 U.S.C. 154(b) by 315 days.

(21) Appl. No.: 11/083,440

(22) Filed: Mar. 17, 2005

(65) Prior Publication Data

US 2005/0207558 A1   Sep. 22, 2005

Related U.S. Application Data

(60) Provisional application No. 60/554,328, filed on Mar. 17, 2004.

(51) Int. Cl.
*H04M 3/00* (2006.01)
*H04M 5/00* (2006.01)

(52) U.S. Cl. .................... 379/265.01; 379/265.02; 379/265.05; 379/265.07; 379/265.1; 379/265.11; 379/266.01; 379/309

(58) Field of Classification Search ............ 379/265.01, 379/265.02, 265.05, 265.07, 265.1, 265.11, 379/266.01, 309
See application file for complete search history.

(56) References Cited

U.S. PATENT DOCUMENTS

| | | | |
|---|---|---|---|
| 4,567,359 A | 1/1986 | Lockwood | 235/381 |
| 5,430,792 A | 7/1995 | Jesurum et al. | 379/67 |
| 5,652,789 A | 7/1997 | Miner et al. | 379/201 |
| 5,724,420 A | 3/1998 | Torgrim | 379/372 |
| 5,729,593 A | 3/1998 | Baker et al. | 379/67 |
| 5,819,029 A | 10/1998 | Edwards et al. | 395/186 |
| 5,828,731 A | 10/1998 | Szlam et al. | 379/88 |

(Continued)

OTHER PUBLICATIONS

Nguyen. Quynh H., "International Search Report and Written Opinion", PCT/US05/09036, (Jul. 27, 2006),6.

*Primary Examiner*—Quynh H Nguyen
(74) *Attorney, Agent, or Firm*—David Fonda

(57) ABSTRACT

An apparatus, system, and method are disclosed for disposing of calls. The apparatus includes a call initiation module, a transfer module, and a presentation module. The call initiation module initiates a plurality of calls. The transfer module transfer a plurality of calls to at least one agent. The presentation module simultaneously presents a plurality of transferred calls to an agent for disposition.

60 Claims, 7 Drawing Sheets

U.S. PATENT DOCUMENTS

| | | | |
|---|---|---|---|
| 5,913,195 A | 6/1999 | Weeren et al. | 704/270 |
| 5,940,497 A | 8/1999 | Miloslavsky | 379/265 |
| 5,946,386 A | 8/1999 | Rogers et al. | 379/265 |
| 5,995,614 A | 11/1999 | Miloslavsky | |
| 6,002,760 A | 12/1999 | Gisby | |
| 6,009,149 A | 12/1999 | Langsenkamp | 379/69 |
| 6,038,544 A | 3/2000 | Machin et al. | 705/11 |
| 6,041,116 A | 3/2000 | Meyers | 379/244 |
| 6,047,060 A | 4/2000 | Fedorov et al. | 379/265 |
| 6,055,513 A | 4/2000 | Katz et al. | 705/26 |
| 6,216,111 B1 | 4/2001 | Walker et al. | 705/14 |
| 6,356,634 B1 | 3/2002 | Noble, Jr. | 379/266.07 |
| 6,587,557 B1 | 7/2003 | Smith | 379/265.01 |
| 6,853,713 B1 * | 2/2005 | Fobert et al. | 379/142.17 |
| 6,965,870 B1 * | 11/2005 | Petras et al. | 705/14 |
| 2002/0138295 A1 | 9/2002 | Ekrem | |
| 2003/0023952 A1 | 1/2003 | Harmon, Jr. | |
| 2003/0202649 A1 | 10/2003 | Haug, Jr. et al. | 379/265.01 |

* cited by examiner

APPARATUS, SYSTEM, AND METHOD FOR DISPOSING OF A CALL

CROSS-REFERENCES TO RELATED APPLICATIONS

This application claims priority to U.S. provisional patent application Ser. No. 60/554,328 entitled Call Predisposition Device, filed Mar. 17, 2004, which is incorporated herein by reference.

BACKGROUND OF THE INVENTION

1. Field of the Invention

This invention relates to an apparatus, system, and method for managing calls from a call center and more particularly to the management of transferring multiple calls to a single agent.

2. Description of the Related Art

In the world of sales, it is axiomatic that the more people you contact, the better the chance of making a sale. Thus people in sales are always trying to contact people in more efficient ways. For example, door-to-door sales people for particular product may make a house call at a time that the buyer of that product is most likely to be home. These same principals apply to telemarketing. One way to increase the rate of connecting with a decision maker during a sales calls is to increase the number of calls made. Statistics can be used to determine the average of number of initiated calls that actually produce a live decision-maker at the other end. For example, at a particular time of day, only 1 out of every 4 calls may yield the live customer you are trying to contact. Using this example, one technique used to increase the efficiency of sales agents actually speaking to live customers is to make four calls for every one available agent.

The problem with this technique is that there may be situations where all four initiated calls produce a live customer, and there are not enough agents to handle all the customers. Under this scenario, three of the calls might be abandoned. This may not have a positive effect on the customer and may hurt future sales. Additionally, sales agents are at their best when they know a live customer will be on the other end of the line. If calls initiated by a sales agent produce five or six wrong numbers or answering machines in a row, the sales agent may be caught off guard when connecting to a live voice, and their sales presentation may be less effective.

An advancement in the art would be to decrease the number of abandoned calls made by a phone calling system while increasing the efficiency and effectiveness of the sales agent. It would be a further advancement in the art to provide a phone calling system that automatically determine the disposition of calls and update a database accordingly. It would be a further advantage if sales agents only had to deal with live customers who were the intended recipient of the sales call. It would be a further advancement if a single agent could handle multiple calls at once. Such a sales calling system is disclosed herein.

SUMMARY OF THE INVENTION

The present invention has been developed in response to the present state of the art, and in particular, in response to the problems and needs in the art that have not yet been fully solved by currently available call management apparatuses, systems, and methods. Accordingly, the present invention has been developed to provide an apparatus, system, and method for managing calls that overcome many or all of the above-discussed shortcomings in the art.

The apparatus to dispose of calls is provided with a logic unit containing a plurality of modules configured to functionally execute the necessary steps of initiating a plurality of calls, transferring a plurality of calls to an agent, and simultaneously presenting a plurality of transferred calls to viewer. These modules in the described embodiments include a call initiation module, a transfer module, and a presentation module.

The apparatus, in one embodiment, is configured to display the progress of calls and to control the rate of calls being transferred to an agent. The apparatus also allows an agent to interact with the call and disposition a call. The apparatus is further configured, in one embodiment, to track the call.

A system of the present invention is also presented to dispose of calls. The system may be embodied in computer telephony interface system. In particular, the system, in one embodiment, includes a dialer that can connect to phone system. A controller may be coupled to the dialer for managing dialing functions. In one embodiment, Input/Output (I/O) devices are configured to interact with an agent. The agent may use the I/O devices to interact with a call by playing scripts on a script player. A memory containing modules for execution on a processor may also be provided. The modules may include those described above. A communication network may couple the dialer, controller, processor, I/O devices, and memory.

A method of the present invention is also presented for disposing of calls. The method in the disclosed embodiments substantially includes the steps necessary to carry out the functions presented above with respect to the operation of the described apparatus and system. In one embodiment, the method includes initiating calls, transferring calls, and presenting calls to an agent. The method also may include displaying call progress and controlling the rate of call transfer. In one embodiment, the method include interacting with a call, disposing of the call and tracking the call.

A computer-readable medium is also disclosed. The computer-readable medium may include instructions to carry out operations to perform the functions of the apparatus described above and the method steps described above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
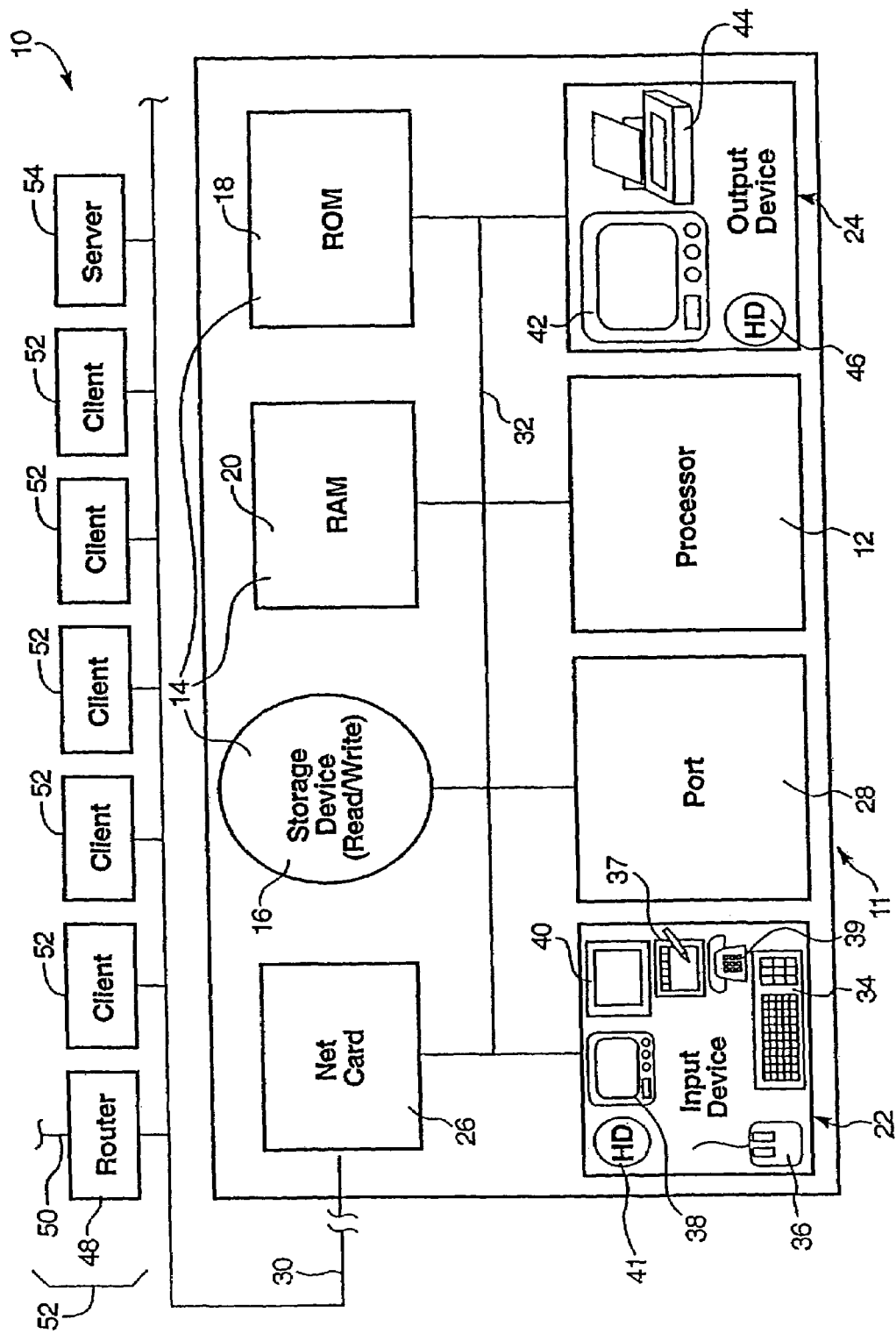
FIG. 1 is a schematic block diagram illustrating one embodiment of a call disposition system according to the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Referring now to FIG. 1, a call disposition system 10 may include a node 11 (client 11, computer 11) containing a processor 12 or CPU 12. The CPU 12 may be operably connected to a memory device 14. A memory device 14 may include one or more devices such as a hard drive 16 or non-volatile storage device 16, a read-only memory 18 (ROM) and a random-access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like. Similarly, a scanner 40 may be used to receive graphical inputs, which may or may not be translated to other character formats. A hard drive 41 or other memory device 14 may be used as an input device whether resident within the node 11 or some other node 52 (e.g., 52*a*, 52*b*, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 may have various communication capabilities.

In certain embodiments, a minimum of logical capability may be available in any node 52. Note that any of the individual nodes 52 may be referred to, as may all together, as a node 52 or nodes 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components of the apparatus 10 may need to communicate data with one another. A communication link may exist, in general, between any pair of devices or components.

Figure 2:
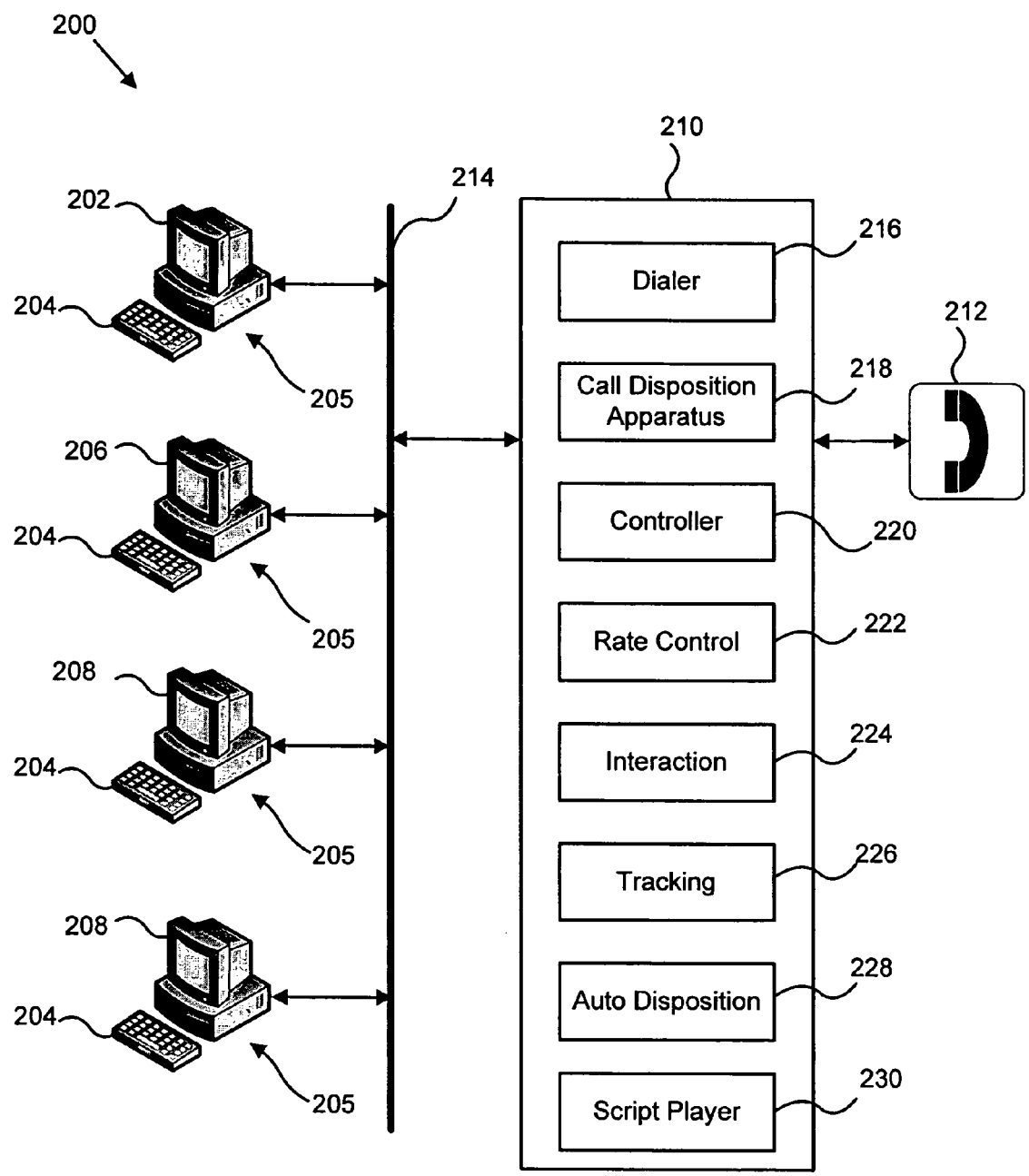
FIG. 2 is a schematic block diagram illustrating another embodiment of a call disposition system according to the present invention.

FIG. 2 illustrates another embodiment of a call disposition system 200 in accordance with the present invention. The system may include the features and operational aspects of FIG. 1. The system may also include a dialer 216 configured to connect to and utilize a phone system 212. In one embodiment, the connection is a T-1 line. In other embodiments, the connection may be through the Internet, broadband lines, cable lines, and the like. A controller 220 may be coupled to the dialer 216. The controller 220 may manage the dialer 216 and facilitate use of the phone system by the call disposition system 200.

The system 200 may include a number of workstations 205 for interacting with the system. Each work station may include Input/Output (I/O) devices 204 configured to interact with a user or agent situation at the workstations 205. As state above, I/O devices may include without limitation, a keyboard, a monitor, a mouse, a touch screen, a headset, a microphone, speakers, printers, scanners, and the like. The I/O devices 204 allow an agent to interact with a call transferred to the work station. The agent may interact with the call by playing prerecorded scripts on a script player 230.

In one embodiment, the script player 230 plays audio files automatically or in response to an input from the agent. The script player may access memory 210 in the calling system 200 to obtain the audio files and play them. The script player 230 may be programmed to sequence various audio files, stop the playing of the audio files, and start the playing of the audio files.

In one embodiment, and initiated call may be transferred to a first agent 202 who makes an initial determination regarding a call. This agent 202 may monitor the initial call and may transfer a connect call to a second agent 206. The second agent may deal with a discrete portion of the call and transfer the call to one or more agents 208 for a final disposition or for further handling of the call. For example, if a call center utilizing the system 200 intends to initiate a calling campaign to take a survey, each question in the survey may be handled be a particular agent 202, 206, 208. That agent 202, 206, 208, once he receives an appropriate answer to the question may transfer the call to the next agent to handle the next question. This process could continue until all the questions have been asked and the call could then be terminated. It will be appreciated by those of skill in the art that it may be easier for an agent to handle multiple survey calls at once when the agent only deals with a single question for each call. In another embodiment, each agent 202, 206, and 208 performs substantially the same purpose or engages in substantially the same interaction with a call as the other agents.

The system 200 may also include a memory 210 containing modules for execution on a processor (not shown). As will be discussed in greater detail below, the modules include a call initiation module, a transfer module, and a presentation module. In one embodiment, these modules make up a call disposition apparatus 218. The call initiation module can initiate a plurality of calls through telephone system 212. The transfer module can then transfer calls to one more agents 202, 206, and 208. The presentation module can present one or more of the transferred calls to one the agents 202, 206, and 208. If multiple calls are transferred to an agent, the presentation module simultaneously presents the plurality of transferred calls to the agent 202, 206, or 208. It will be appreciated by those of skill in the art that any number of agents may utilize the system.

The system 200 and/or the call disposition apparatus 218 may also include additional modules that may be housed in the memory 210. In one embodiment, these modules include a rate control module 222 for controlling the rate of calls transferred by the transfer module. The rate control module 222 may control the rate of the calls being transferred by controlling the rate in which the calls are initiated. In one embodiment, this occurs automatically based on a variety of factors, including, but not limited to, the number of available agents, the number of phone lines being utilized, the time of day, the number of people answering phones, the type script being used, the experience of the various sales, call monitor, and customer service agents, the product being sold, the date, the sales campaign being implemented, and the like.

The rate control module 222 may also control the rate at which calls are initiated by use of a manual knob or control setting, which limits the number of initiated calls initiated by the dialer 216.

In another embodiment, the rate control module may control the rate at which calls are transferred to an agent by varying the length of the initial message played when a call connects. For example, the call initiation module may automatically play a message or script when a someone answers the phone at the number called by the dialer 216. The dialer may call several numbers simultaneously using calling executables and algorithms. If multiple calls connect at substantially the same time, the rate control module 222, in conjunction with the call initiation module discussed later, may play one introduction for the first call and a second introduction that conveys the same meaning, but is a different length, for the second call. One introduction or opening statement may be, "Hi, is Bob there?" If another call to bill connects at substantially the same time as the call to Bob, the system 200 may play "Hello, this is John Doe, is Bill at home?" This introduction is longer than the first introduction to Bob. Thus, even though the calls connect at the same time, they are not transferred at the same time. Accordingly, the rate control module 222 controls the rate or pace of the transferred calls.

The rate control module 222 may control the rate at any point in the call using the methods described above and other pacing techniques. In an embodiment where each call is handled in portions by different agents, the rate control module 222 may, in conjunction with the script player 230, play different scripts of variable lengths to handle a particular portion of the call.

In one embodiment, the memory 210 includes an interaction module 224 that allows an agent to interact with a person associated with a call transferred by the transfer module. The interaction module may allow the agent to choose various responses, script options, or other inputs presented by the presentation module. These responses may take the form of prerecorded scripts played by the script player and initiated by a touch screen icon. The interaction module may also allow an agent to switch between the playing of prerecorded scripts and speaking in live voice to the person called. The interaction module 224 may control and initiate executable files based on inputs from the call monitor agent, the customer, or from other sources.

In one embodiment, the interaction module 24 provides for interaction by using one or more of the I/O devices 204. The agent may wear headphones that include an earpiece and a microphone. The call monitor agent may also have a keyboard, a touch screen, or other input device connected to a signal processor within the calling system 10. As will be discussed in greater detail below, the interaction module 224 utilizes the presentation module to display various options to the agent. The interaction module 224 initiates executable files or commands when the agent gives an input by touching the screen or keyboard, or by speaking into the microphone. For example, an agent, by means of the keyboard or touch screen, may cause a sound card or other device to play a particular audio file, update a database record, and then disconnect the call. It may also cause the microphone to mute. Inputs from the agent may also cause the initiation of an executable, which will transfer the call. The presentation module may also include screen navigation options or other types of menu options.

The following table represents various dispositions, which could be executed by key stroke, by touch, or by other input. The table illustrates a button description, a key, an operation to be performed by engaging the key, and a possible subsequent operation to be performed in response to the input. The first operation may be described as a disposition and may relate to a particular call situation.

| Button Desc | Key | Operation | Operation After Wav is Finished |
|---|---|---|---|
| Mach/Ring/Busy | 5 | Disposition 2509 | N/A |
| Disconnect | 6 | Disposition 2529 | N/A |
| Dead Air | 7 | Disposition 2534 | N/A |
| Privacy Manager | / | Disposition 3324 | N/A |
| Fax | * | Disposition 2533 | N/A |
| Wrong Number | 8 | Plays Wave Screener04 | Disposition 2508 |
| Call Back | 1 | Plays Wave Screener01 | Disposition 2507 |
| Call Back (No Sound) | N/A | Disposition 2507 | N/A |
| Play Name | 0 | Plays Wave Screener08 | N/A |
| Stop Name | 9 | Stops Wave | N/A |
| Who's Calling | 3 | Plays Wave Screener02 | Plays Wave Screener07 or Clicks the "+" key |
| Yes | – | Plays Wave Screener05 | N/A |
| Resched | + | Plays Wave Screener06 | Disposition 2507 |
| No | 4 | Plays Wave Screener09 | N/A |

-continued

| Button Desc | Key | Operation | Operation After Wav is Finished |
|---|---|---|---|
| Ok | Enter | Plays Wave Screener10 | N/A |
| Transfer | 2 | Plays Wave Screener03 | Transfers Call |
| Trx CS | . | Plays Wave Screener11 | Transfer to diff camp |
| Stop Auto | Space | Stops Auto Disp | N/A |

In one embodiment, the call interaction module 224 may be programmed with one or more defaults for initiating an executable file, or otherwise handle a call under certain predetermined situations or conditions. For example, if the agent is given an option to take control of the call and doesn't, the call interaction module 224 may initiate a default set of executables to automatically deal with that situation. Additionally, other default instructions may automatically be executed if the agent doesn't interact with, or erroneously interacts with, a call by choosing an incorrect option.

The memory 210 may also include a tracking module 226 for keeping statistical information regarding calls transferred by the transfer module. The tracking module 226 may record which call interaction options were played by an agent at any time during a call. The tracking module 226 is configured to keep track of how many calls did not connect and other statistical information regarding the call. The tracking module 226, in one embodiment, tracks how many calls are transferred and initiated, when calls are lost, the disposition of each call, and the like. The tracking module 226 provides statistical analysis and may update information regarding calls and customers to a database (not shown).

The database may include standardized database products known in the industry including products by Sybase®, or Oracle®. The database may structure data or records according to a schema and allow access to the data. The database may be part of the tracking module 226 to facilitate tracking all aspects of a call initiating from a particular work station within the calling system 200. In one embodiment, the tracking module 226 interacts with the database by sending commands or requests for data records. The tracking module 226 may search, sort, filter, and modify data records in the database. The tracking module 226 may also contain a report module for compiling and outputting various reports.

The memory 210 may also include an automatic disposition module 228 for automatically dispositioning or disposing of a call based on one or more predetermined call statuses. These statuses include without limitation when the call connects to an answering machine or a call service, dials a wrong number, encounters a disconnect, encounters a recording, encounters dead air, and the like. A call could be automatically disposed of by automatic the disposition module 228 before a call is transferred or at other times during the call. In one embodiment, the disposition module 228 is used to play a polite closing script in the event failed transfer by the transfer module.

A communication network 214 couples the dialer 216, controller 220, processor not shown, I/O devices 204, and memory 210. The communication network may be any of a number of suitable communication networks known in the art, including, but not limited to a storage area network, (SAN), local area network (LAN), wide area network (WAN), the Internet, a direct connection via a point to point or multi-drop buss connection, for example, a Small Computer Storage Interface (SCSI) interface, and the like.

Figure 3:
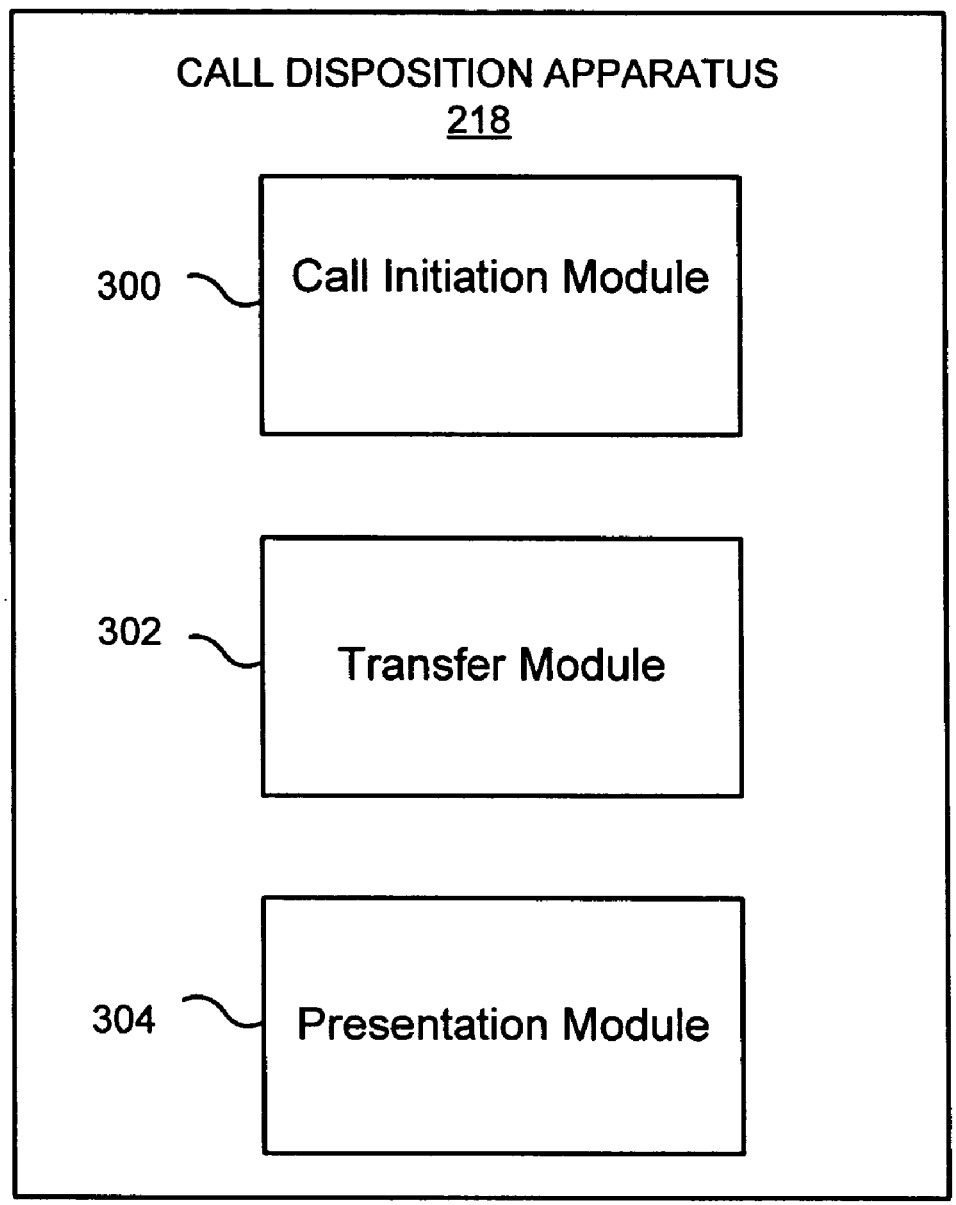
FIG. 3 is a schematic block diagram illustrating one embodiment of a call disposition apparatus suitable for use with the call disposition system of FIG. 2.

FIG. 3 illustrates a call disposition apparatus 218 of the present invention. As discussed above, the call disposition apparatus 218 can be part of a larger call disposition system, or it can be a stand-alone unit. It may reside in the system memory or in a separate memory location. The apparatus 218 includes a call initiation module 300 configured to initiate a plurality of calls. The apparatus 218 also includes a transfer module 302 configured to transfer a plurality of calls to at least one agent. The apparatus also includes a presentation module 304 capable of simultaneously presenting a plurality of transferred calls to an agent.

The call initiation module 300 may work in conjunction with a dialer and a database, as described above, to initiate calls to various potential customers or other people in a calling campaign. The call initiation module 300 may initiate a call to a customer (contact or caller) over a telecommunications network. In one embodiment, the call initiation module 300 works in conjunction with the presentation module 304 to indicate to an agent that the call has been initiated, when it actually makes a connection, and when the connection is terminated. In one embodiment, the call initiation module 300 may interact with the database and call potential customers or contacts based on statistical information stored in the database. The calling initiation module 300 may also pass information based on a call to the database for updating.

In one embodiment, the call initiation module 300 identifies several predetermined situations that can occur when a call is initiated. These situations or conditions, may include, but are not limited to, connection with desired customer, a live voice that is not the desired customer, an answering machine, a fax machine, a wrong number, a telecommunication system or other type of recording, dead air, a privacy manager, a disconnect, and the like. The calling device may be programmed to initiate an executable file to handle some or all of these conditions either automatically, in conjunction with the auto disposition module, or by providing options to an agent, in conjunction with the presentation module, to manually execute executables to handle the situation.

When an agent logs into the system or apparatus 218, the call initiation module may immediately start dialing numbers stored in the database. If a call goes through or connects, the calling system may play a typical phone conversation opening. For example, the dialing (FIG. 2) may call a number that it associates with John Smith. When the call connects, the calling system may play a script that says "Hi, is John there?" or something similar.

As discussed above, the call initiation module 300, in conjunction with the automatic or auto disposition module 228 (FIG. 2) automatically disposes of the call. For example, if in response to the playing of an opening script such as "Hello, may I please speak to Bob," there is a 7 second monologue on the other end, the calling device module probably connected with a recording. A live person would probably have answered "speaking" or "just a minute," or "he's not here right now." All of these responses take less than 5 seconds for a live contact to deliver in response to the calling systems opening line. Thus, based on statistics, observations, or other methods, assumptions can be made about a contact's response to the system's or apparatus' opening line and the system can then automatically handle, or dispose of a call base on those assumptions. In the present invention, calls can be automatically disposed of based on contact answering assumptions because the call initiation module 300 is configured to know when the contact starts and stops talking.

In one embodiment, it is assumed that any response to an opening line that lasts longer that 5 seconds is a recording. The call initiation module 300 may be programmed to distinguish between an answering machine recording and a wrong number recording and dispose of the call accordingly. Additionally, the call initiation module 300 may be programmed with a default condition to dispose of all types of recordings unless the agent identifies what type of recording it was. Sometimes it is desirable for the agent to identify the type of recording or type of non live voice response so that the database can more accurately update the information associated with that particular phone number. In one preferred embodiment, the call initiation module 300 includes a default set of executable files in case the agent freezes up or can't respond quickly enough.

The call initiation module 300 handles the call until it is determined that the customer or person on the other end of the phone is the person who the calling system was trying to reach, or a suitable call candidate.

When a connection is established between the caller and a person associated with the phone number called, the transfer module 302 transfers the call to an agent. In one embodiment, the agent is a customer service agent to handle an unexpected situation related to the call initiation. The agent may be a monitoring agent who may interact with the person called. The transfer module 302 transfers a plurality of calls to at least one agent.

In one embodiment, the transfer module 302 is configured to stagger the transfer of calls such that no two calls arrive to the same agent at the same time. Each agent may be handling a plurality of calls at once. The handling may include monitoring the call, interacting with the call, disposing of the call, and the like. In certain embodiments, when a call is first transferred, action is required by the agent. It will appreciated by those of skill in the art that staggering the transfer of calls allows the agent to better handle a plurality of calls.

The transfer module 302 is further configured to transfer a call between agents after the call is initiated. In some calling campaigns, each agent is assigned to interact with a call during a certain part of the call. For example, if the purpose of the call is to ask a three-question survey, a different agent may be assigned to handle each of the questions for every call. When the first agent receives a suitable response, such as the answer to the question, that agent may transfer the call to the next agent by means of the transfer module 302. In one embodiment, the transfer module 302 is also configured to adjust the rate at which calls are transferred. The transfer module 302 is configured to transfer the call to any available agent.

Figure 4:
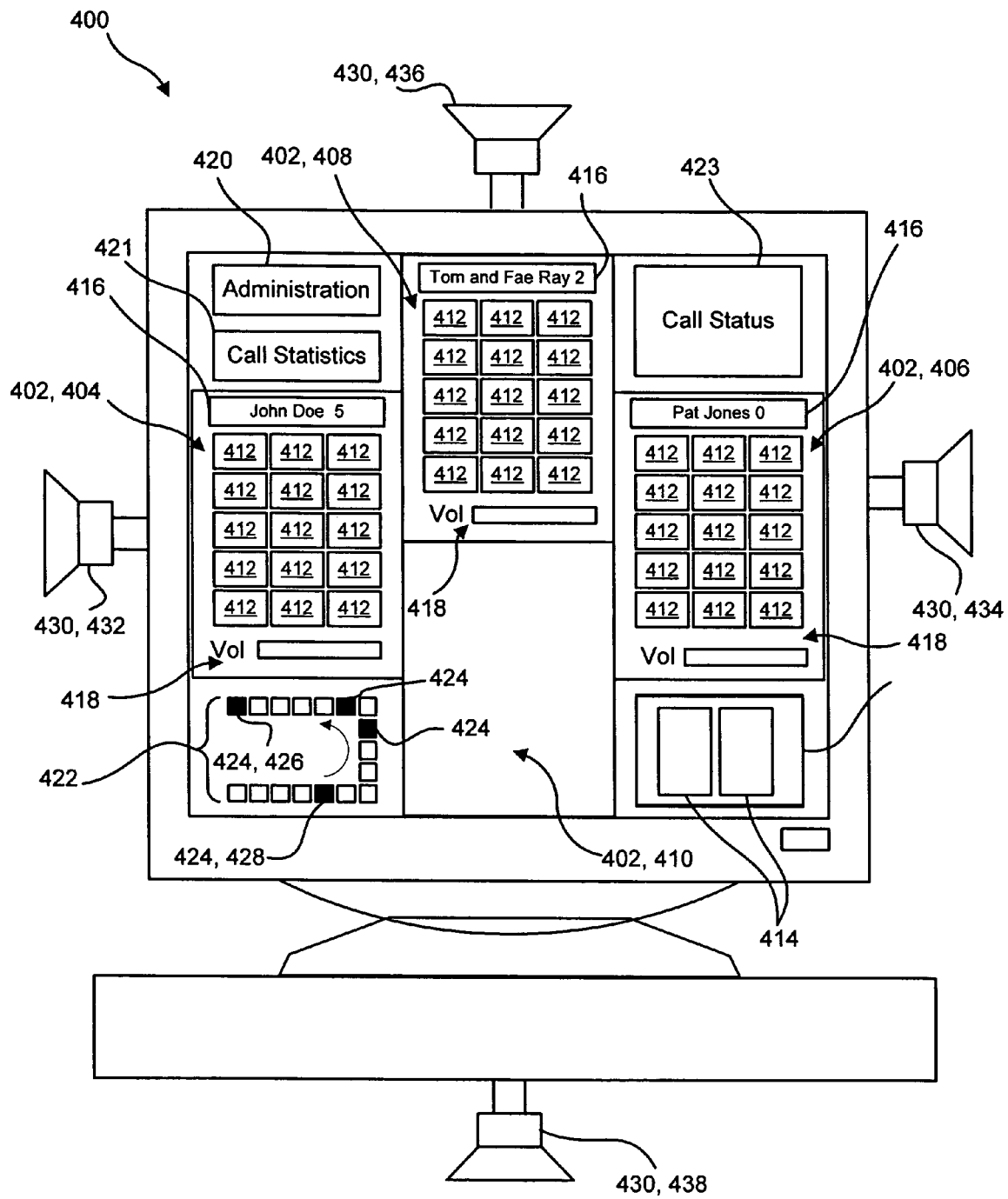
FIG. 4 is a schematic block diagram illustrating one embodiment of a call presentation to an agent in accordance with the present invention.

FIG. 4 illustrates an agent workstation after a plurality of calls have been initiated and transferred to the agent. The presentation module is configured to display call interaction options 412 corresponding to each transferred call, to a viewer 400. The viewer may include a monitor, a screen, and the like.

The interaction options 412 facilitate an agent's ability to efficiently interact with the person being called. These options 412 may include inputs to deal with situations such a hang up, a recording, or an unexpected answer to a scripted question previously played. The options 412 may include a variety of scripts to be played in response to a person's statements or questions. The options 412 may include options to repeat a script. The options 412 may include scripts to enhance conversation such as a "laugh" or an "uh huh." The options 412 may also include scripts to be played in conjunction with various types of call transfers. The options 412 may also allow an agent to play interjection scripts.

For example, it is often the case that a person called may not have understood the opening line or other played script, and say "what?" The agent could press a "repeat intro" option 412 on the screen or viewer. Touching this call option 412 may launch an executable that replays the introduction or a variation of the introduction to the caller. If the contact asks "who's calling?" or "who is this please?" the agent may press the "who is it" option button which in one embodiment plays a script that responds appropriately. If the contact says "you've got the wrong number," the agent may utilize a "wrong number" option, which in one embodiment plays an appropriate apology, hangs up, and updates the database to reflect this information. If the contact wants to be called back later, a "call back message" button may play an appropriate script that agrees to do that and politely ends the call. The database is then automatically updated to reflect this information upon the pressing of this button. It will be appreciated by those of skill in the art that a call interaction option 412 may be implemented in a variety of ways, including without limitation, key strokes and voice commands.

In operation, the system may be automated such that the call monitor simply presses a button to dispose of a call in one of a number of ways. In some situations, the call monitoring agent may need to get out of automatic mode to properly deal with the customer by switching to a live mode. In one embodiment, an "extras" button may be used to switch to another screen of call interaction options. Using two or more screens in this fashion allows the calling system to have a less-cluttered display by showing only the most often used options to the call monitoring agent. Lesser used options can be consolidated on a second screen.

It will be appreciated by those of skill in the art that the location and content in a call interaction option may vary. Additionally, the executable files associated with each touch screen, voice command, or key stroke option can be programmed to carry out a variety of commands, including but not limited to, playing a script, executing a hang up sequence, executing a call transfer sequence, updating a database, storing a response, outputting data or a report, and the like.

The presentation module 304 may also present information 416 regarding the caller, product being sold, survey being conducted, and the like. The information may include the person's name and phone number, how many people in the household, and purchasing information about the person.

The presentation module 304 may also display administration options 420 such as login and logout buttons, which when pushed, run executables to allow an agent to login. Other administrative information may be presented, including, but not limited to, login times, logout times, campaign identifiers, script identifiers, voice identifiers for recorded scripts, agent identifiers, and the like. In one embodiment, the presentation module 304 also displays statistical information 421 related to the calls. These may include, without limitation, total calls, transfers, initiated calls, transfer percentages, call rates, transfer rates, and the like.

The presentation may also display call status information 423 for the calls being handled by the agent. These options may include whether the call is playing a script in the background, whether a person is talking, whether a call is waiting for a response from the agent, whether a line is free, which lines are being utilized, and the like.

The presentation module 304 may also display call control options 418 including, but not limited to stop buttons, pause buttons, start buttons, volume controls, print options, on/off buttons, clear buttons, and the like. Each button or input option may be implemented by a touch, a keystroke, a voice command, a mouse click, and the like. Each button or input option may be linked to executables or modules for performing various commands. It will be appreciated by those of skill in the art that other input options may be utilized to facilitate the teachings of the invention. Furthermore, the input options may be located in a variety of locations to practice the teachings of the invention.

The presentation module 304 is configured to display call interaction options 412 for transferred calls that are handled simultaneously. Simultaneous transferred calls are presented to separate and distinct locations 402 on the viewer 400. The call interaction options 412 are displayed to locations 402 based upon the order in which transferred calls are first received by the agent. In one embodiment, a designated first location 404 occupies an area on the left side of the viewer 400, a second location 406 occupies an area on the right side of the viewer 400, a third location 408 occupies an area at the top of the viewer 400, and a fourth location 410 occupies an area at the bottom of the viewer 400.

As calls are transferred, they are presented in the first available location 402, starting with the first location 404 and progressing, if necessary, to the fourth location 410. A buffer 414 is provided to temporarily store calls until a location opens up for the display of call interaction options 412.

In one embodiment, information related to a call is highlighted based on a status or state of the call received by the agent. In one embodiment, the call options 412 are highlighted. In another embodiment, the call status information is highlighted. Highlighting may include without limitation, coloring, symbols, font types, underlining, bolding, italicizing, blinking, other visual or audio effects, and the like. Call information may be highlighted to indicate a call running in the background, the playing of an audio file, inactivity, the last call interaction option utilized, when a person called speaks or makes noise, and the like.

The presentation module 304 is configured to play transferred calls to speakers 430 or other audible output devices. Simultaneous transferred calls are also presented to separate and distinct speakers 430. Calls may be played on speakers 402 based upon the order in which transferred calls are first received by the agent. In one embodiment, a designated first speaker 432 occupies an area to the left of the viewer 400, a second speaker 434 occupies an area to the right of the viewer 400, a third speaker 436 occupies an area above the viewer 400, and a fourth speaker 438 occupies an area below the viewer 400. In one embodiment, the first 432 and second 434 speakers art the left and right speakers of an agents headphones respectively. It will be appreciated by those of skill in the art that the location of call option displays and speakers is discretionary and the teachings of this invention can be practiced using a variety of display and speaker locations.

Transferred calls are played to a speaker based upon the order in which transferred calls are first received by the agent. As calls are transferred, they are presented in the first available location 430, starting with the first location 432 and progressing, if necessary, to the fourth location 438. A buffer 414 is provided to temporarily play calls until a speaker location opens up. In one embodiment, each display location 402 corresponds to a speaker location 430. The presentation module 304 may mute a speaker 430 until the person calls speaks or makes a noise. By making the call inaudible to the agent unless a voice associated with the transferred call is heard, the agent is less likely to experience sensory overload.

The presentation module 304 is further configured to display the progress of calls 422 to be transferred to an agent. In one embodiment, a progression of lights 424 indicates the number of calls to be transferred to the agent. The distance between the lights may indicate the time between the calls to be transferred. A light occupying a "last space" 426 may indicate that the transfer in eminent. Each block 428 may indicate a certain amount of time. It will be appreciated by those of skill in the art that the advancing lights allow an agent to identify when the calls will be transferred. In other embodiments, color coded lighting schemes or other arrangements may be used to identify when calls will be transferred.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
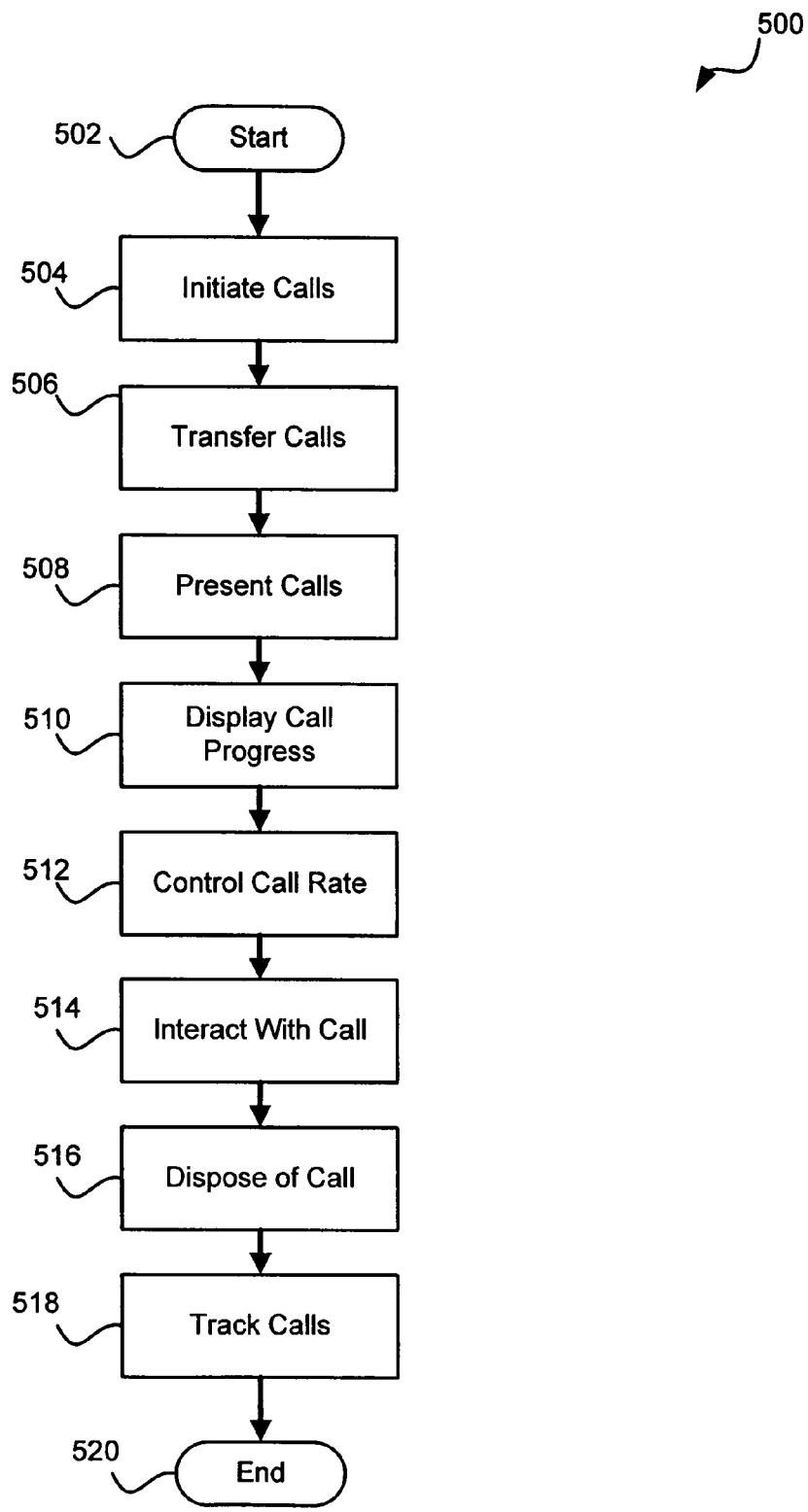
FIG. 5 is a schematic flow chart diagram illustrating one embodiment of a method for disposing of calls that may be implemented on the call disposition system of FIG. 2.

FIG. 5 illustrates a flow chart 500 of a method according to the present invention. The method 500 could be practiced on the system and apparatus described above, in accordance with the present invention. As discussed above, after the start 502, the method may include the steps of initiating a plurality of calls 504, transferring a plurality of calls to at least one agent 506, presenting a plurality of transferred calls to an agent 508, displaying the progress of calls 510, controlling the rate of transferred calls 512, interacting with a call 514, automatically disposing of a call 516, tracking a call 518 and ending 520 the method.

The transferring of calls is staggered such that no two calls arrive to the same agent at the same time. The transferring of calls in one embodiment occurs when a connection is established between the caller and a person associated with the phone number called. The step of transferring may also include adjusting the rate at which calls are transferred.

Presenting a call includes displaying call interaction options, corresponding to each transferred call, to a viewer. The call interaction options for simultaneous transferred calls are presented to separate and distinct locations on the viewer. The call interaction options are displayed to locations based upon the order in which transferred calls are received by the agent. Presenting the call includes highlighting information about a call based on a status of the call received by the agent. Presenting a call also includes playing the call to a speaker. Simultaneous transferred calls are played to separate and distinct speakers. The calls are played to a speaker based upon the order in which transferred calls are received by the agent. In one embodiment the call is inaudible to the agent unless a voice associated with the transferred call is audible.

Presenting the call includes displaying call interaction options associated with each transferred call to distinct locations on a viewer and by playing the call on one or more speakers, each speaker corresponding to a distinct viewer location.

Displaying the progress of calls to the agent includes identifying when the calls will be transferred. Controlling the rate of transferred calls may be done by playing scripts of variable length before transferring the call. Calls can be automatically dispositioned or disposed of based on one or more predetermined call statuses. Interacting with the call includes playing prerecorded scripts. It also includes speaking in live voice to the person called. Tracking each transferred call includes keeping statistics related to each call.

A signal bearing medium is also presented to store a program that, when executed, performs one or more operations to recall logical volumes from mountable media. In one embodiment, the operations include performing the method steps outlined above.

Figure 6:
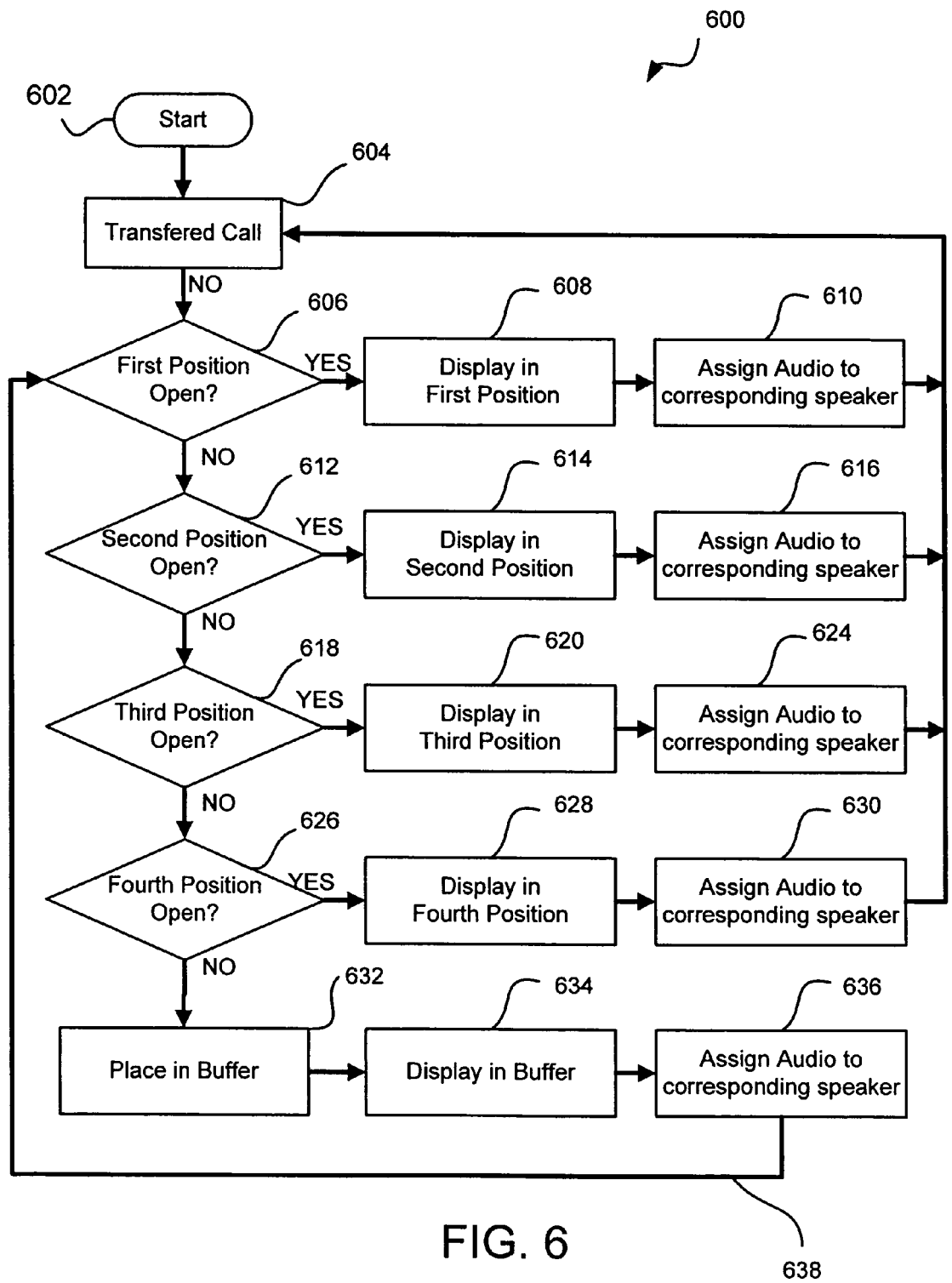
FIG. 6 is a schematic flow chart diagram illustrating one embodiment of a method for presenting calls that may be implemented on the call disposition system of FIG. 2.

FIG. 6 illustrates a flow chart 600 illustrating one method of presenting a call in accordance with the present invention. After the start 602, a call is transferred 604 to an agent for presentation on a viewer have positions allocated for displaying information or call options associated with the call. The method 600 determines 606 whether a designated first position is open. If it is, the call, or information relating to the call is displayed 608 in the first position and the call is assigned 610 to be played in a corresponding speaker. The next transferred call is received 604.

If the designated first position is not open, the method 600 determines 612 whether a designated second position is open. If it is, the call, or information relating to the call is displayed 614 in the second position and the call is assigned 616 to be played in a corresponding speaker. The next transferred call is received 604.

If the first and second positions are not open, the method 600 determines 618 whether a designated third position is open. If it is, the call, or information relating to the call is displayed 620 in the third position and the call is assigned 624 to be played in a corresponding speaker. The next transferred call is received 604.

If the first, second, and third positions are not open, the method 600 determines 626 whether a designated fourth position is open. If it is, the call, or information relating to the call is displayed 628 in the fourth position and the call is assigned 630 to be played in a corresponding speaker. The next transferred call is received 604.

If none of the designated positions are open, the call is placed 632, and is displayed 634 to the viewer that it is in the buffer. The call is assigned 636 to be played in a corresponding speaker. The method 600 then repeated checks 638 whether any display positions are opened and once one is, the buffered call is placed in the first available position.

Figure 7:
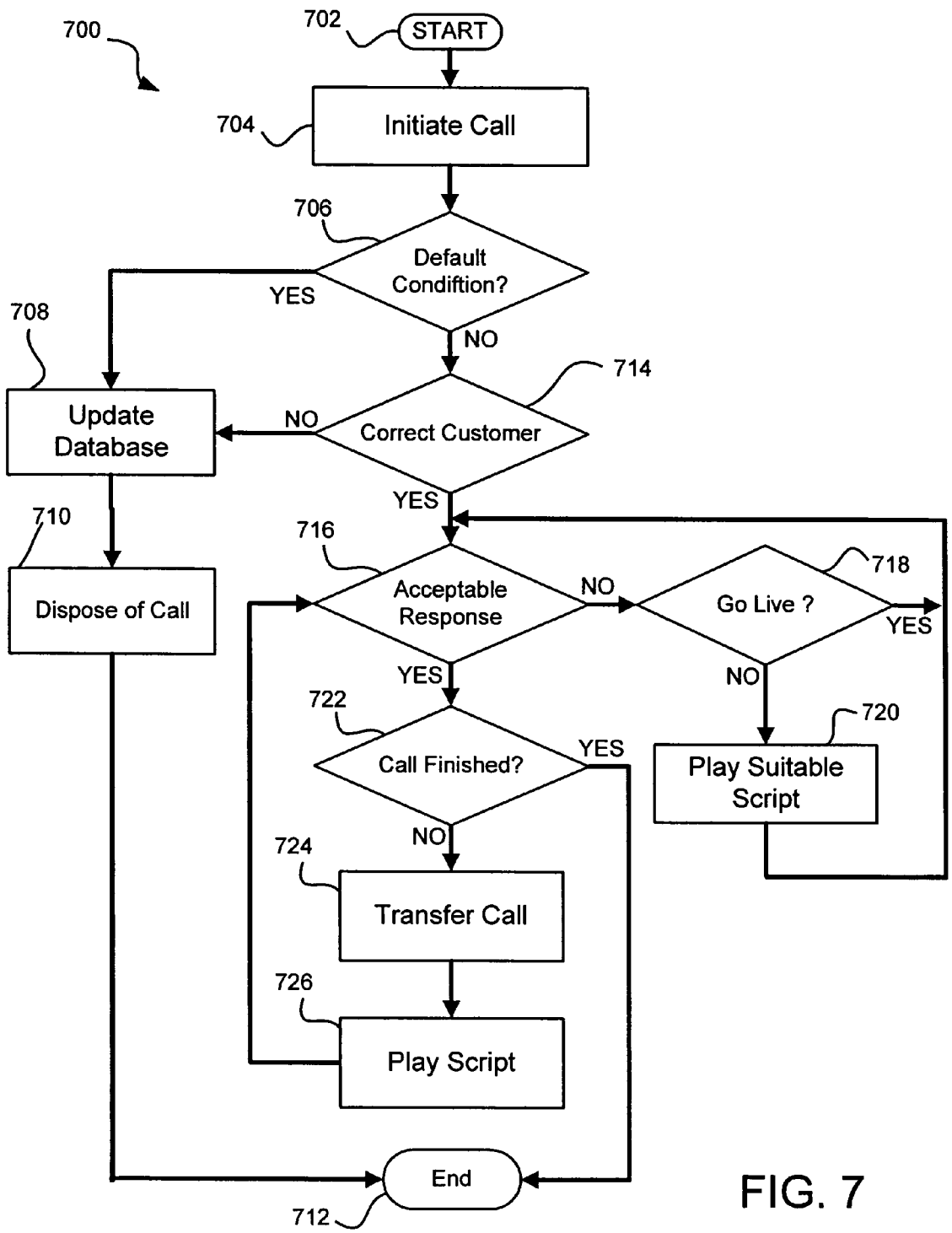
FIG. 7 is a schematic block diagram illustrating one embodiment of a process according to the present invention.

FIG. 7 illustrates a method 700 of transferring calls according to one embodiment of the present invention. After the start 702 of the method 700, a call is initiated 704. The method then determines whether a default condition exists that would allow the automatic disposition of the call. If there is, the data base is updated 708, the call is disposed of 710 and the call ends 712. If there is no default condition, the method 700 determines 714 whether the person called is the correct customer or contact. If not, the database is updated 708, the call is disposed of 710 and the call ends 712. If the contact or customer is correct, a script is played to solicit a response. If the response is deemed unacceptable 716, the method determines 718 whether to go live to handle the issue. If it does not determine to go live, a suitable script 720 is played. This script may be a restatement of the script used to solicit the first response. The method 700 then determines 716 whether an acceptable response was given. This process is repeated until an acceptable response is given. In many instances an acceptable response is any audible intelligible statement by the contact that is not a question.

Once an acceptable response is given the method 700 determines 722 whether the call is finished, or in other words, if the there are no more questions for the contact. If it is, the call ends 712. If not, the call may be transferred 724 to the next agent to handle the next part of the call. A script to solicit a response is played 726 and the method determines 716 whether an acceptable response is given. The process continues until the call if finished 722. In this configuration, a call center may split up portions of a calling campaign amongst several agents. Each agent need only concentrate on the same portion of the script. In this way, agents are better able to handle multiple calls.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus to dispose of a plurality of calls, the apparatus comprising:
    a processor;
    a viewer in electronic communication with the processor;
    memory in electronic communication with the processor;
    instructions stored in the memory, the instructions being executable to:
        initiate a plurality of calls;
        transfer a plurality of calls to an agent, each transferred call corresponding to a phone connection with a person, and wherein said transfer of plurality of calls is staggered such that the start of a second transferred call to an agent occurs after the start of a first transferred call to said agent;
        selectively display call interaction options corresponding to each of the transferred calls to a location on the viewer, wherein when call interaction options corresponding to a first transferred call occupy a first location on the viewer, call interaction options corresponding to a second call transferred to the agent during the first transferred call occupy a second location on the viewer distinct from the first location, to allow the agent to control the interaction with more than one called person at the same time;
        play the call on one or more speakers, wherein a first transferred call is played to a first speaker and a second call transferred during the first call is played on a second speaker; and
    wherein the call interaction options each correspond to an executable file configured to play a prerecorded script to said person, and wherein the selection of a call interaction option by an agent is dependent upon one or more actions by said person, said actions comprising a verbal input, a sound generated by the person, a pause, and combinations thereof.

2. The apparatus of claim 1, further comprising instructions stored in the memory executable adjust the rate at which calls are transferred.

3. The apparatus of claim 1, wherein the call interaction options are displayed to locations based upon the order in which transferred calls are first received by the agent.

4. The apparatus of claim 1, wherein call interaction options for playing prerecorded scripts to a called party are highlighted when a person associated with the transferred call is audible.

5. The apparatus of claim 1, further comprising instructions stored in the memory executable to play a transferred call that has elicited an audible response to a speaker.

6. The apparatus of claim 5, wherein simultaneous transferred calls that have elicited simultaneously audible responses are played to separate and distinct speakers.

7. The apparatus of claim 5, wherein a transferred call which presently contains an audible response is played to a speaker based upon the order in which the audible response is first received by the agent.

8. The apparatus of claim 5, wherein the transferred call is inaudible to the agent unless a voice associated with the transferred call is audible.

9. The apparatus of claim 1, further comprising instructions stored in the memory executable to display the progress of transferred calls to an agent.

10. The apparatus of claim 9, wherein displaying the progress of calls to the agent comprises identifying when the calls will be highlighted.

11. The apparatus of claim 1, further comprising a rate control module for controlling the rate of transferred calls by playing scripts of variable length before transferring the call.

12. The apparatus of claim 1, further comprising instructions stored in the memory executable to automatically disposition the call based on one or more predetermined call statuses.

13. The apparatus of claim 12, wherein the status is one of encountering a recording, encountering a wrong number, a disconnect, dead air, and a failed transfer.

14. The apparatus of claim 1, further comprising further comprising instructions stored in the memory executable to allow an agent to interact with a person associated with the transferred call.

15. The apparatus of claim 14, wherein interacting with the call comprises allowing an agent to select and play one or more prerecorded scripts.

16. The apparatus of claim 14, further comprising instructions stored in the memory executable to allow the agent to choose to use live voice with the person associated with the call.

17. The apparatus of claim 1, further comprising instructions stored in the memory executable to keep statistical information regarding each transferred call.

18. A system for disposing of telephone calls, the system comprising:
    a dialer configured to connect to and utilize a phone system;
    a controller coupled to the dialer;
    input/Output (I/O) devices configured to interact with a user;
    a script player;
    a memory containing modules for execution on a processor, the modules comprising:
        a call initiation module configured to initiate a plurality of calls;
    a transfer module configured to transfer a plurality of calls to at least one agent, said plurality of calls each associated with a phone connection established between a caller and a person associated with a phone number called, and wherein said transfer of plurality of calls is staggered such that the start of a second transferred call to an agent occurs after the start of a first transferred call to said agent;
    a presentation module capable of selectively displaying call interaction options corresponding to each of the transferred calls to a location on a viewer, wherein when call interaction options corresponding to a first transferred call occupy a first location on the viewer, call interaction options corresponding to a second call transferred to the agent during the first transferred call occupy a second location on the viewer distinct from the first location, and wherein a first transferred call is played on a first speaker and a second call transferred during the first call is played on a second speaker, to allow the agent to control the interaction with more than one called person at the same time, wherein the call interaction options each correspond to an executable file configured to play a prerecorded script to said person, and wherein the selection of a call interaction option by an agent is dependent upon one or more actions by said person, said actions comprising a verbal input, a sound generated by the person, a pause, and combinations thereof; and a communication network coupling the dialer, controller, processor, I/O devices, and memory.

19. The system of claim 18, wherein the memory further comprises a rate control module for controlling the rate of calls transferred by the transfer module.

20. The system of claim 18, wherein the memory further comprises an interaction module allowing an agent to interact with a person associated with a call transferred by the transfer module.

21. The system of claim 18, wherein the memory further comprises a tracking module for keeping statistical information regarding calls transferred by the transfer module.

22. The system of claim 18, wherein the memory further comprises an automatic disposition module for automatically dispositioning the call based on one or more predetermined call statuses.

23. A method for disposing of a plurality of telephone calls, the method comprising:

initiating a plurality of telephone calls from a dialer;

transferring a plurality of initiated calls to an agent workstation corresponding to a telephone connection with a person, wherein said transfer of plurality of calls is staggered such that the start of a second transferred call to an agent occurs after the start of a first transferred call to said agent; and utilizing computer instructions to selectively display call interaction options corresponding to each of the transferred calls to a location on a viewer, wherein when call interaction options corresponding to a first transferred call occupy a first location on the viewer, call interaction options corresponding to a second call transferred to the agent during the first transferred call occupy a second location on the viewer distinct from the first location, and wherein a first transferred call is played on a first speaker and a second call transferred during the first call is played on a second speaker, to allow the agent to control the interaction with more than one called person at the same time, wherein the call interaction options each correspond to an executable file configured to play a prerecorded script to said person, and wherein the selection of a call interaction option by an agent is dependent upon one or more actions by said person, said actions comprising a verbal input, a sound generated by the person, a pause, and combinations thereof.

24. The method of claim 23, wherein transferring comprises adjusting the rate at which calls are transferred.

25. The method of claim 23, wherein the call interaction options are displayed to locations based upon the order in which transferred calls are received by the agent.

26. The method of claim 23, wherein call interaction options for playing prerecorded scripts to a called party are highlighted when a person associated with the transferred call is audible.

27. The method of claim 23, wherein presenting a call comprises playing the call that has elicited an audible response to a speaker.

28. The method of claim 27, wherein simultaneous transferred calls that have elicited simultaneously audible responses are played to separate and distinct speakers.

29. The method of claim 27, wherein the call which presently contains an audible response is played to a speaker based upon the order in which the audible response is first received by the agent 30. The method of claim 23, wherein the transferred call is inaudible to the agent unless a voice associated with the transferred call is audible.

31. The method of claim 23, further comprising displaying the progress of transferred calls to an agent.

32. The method of claim 31, wherein displaying the progress of calls to the agent comprises identifying when the calls will be highlighted.

33. The method of claim 23, further comprising controlling the rate of transferred calls by playing scripts of variable length before transferring the call.

34. The method of claim 23, further comprising automatically dispositioning the call based on one or more predetermined call statuses.

35. The method of claim 23, further comprising interacting with the call.

36. The method of claim 23, wherein interacting with the call comprises allowing an agent to select and play one or more prerecorded scripts.

37. The method of claim 35, wherein interacting with the call comprises speaking in live voice to the person called.

38. The method of claim 23, further comprising keeping statistical information regarding each transferred call.

39. A tangible computer-readable medium storing instructions executable by a digital processing apparatus to perform an operation to dispose of calls, the operation comprising:

initiating a plurality of telephone calls;

transferring a plurality of calls to at least one agent, each transferred call corresponding to a phone connection with a person, wherein said transfer of plurality of calls is staggered such that the start of a second transferred call to an agent occurs after the start of a first transferred call to said agent; and selectively displaying call interaction options corresponding to each of the transferred calls to a location on a viewer, wherein when call interaction options corresponding to a first transferred call occupy a first location on the viewer, call interaction options corresponding to a second call transferred to the agent during the first transferred call occupy a second location on the viewer distinct from the first location, and wherein a first transferred call is played on a first speaker and a second call transferred during the first call is played on a second speaker, to allow the agent to control the interaction with more than one called person at the same time, wherein the call interaction options each correspond to an executable file configured to play a prerecorded script to said person, and wherein the selection of a call interaction option by an agent is dependent upon one or more actions by said person, said actions comprising a verbal input, a sound generated by the person, a pause, and combinations thereof.

40. The computer readable storage medium of claim 39, wherein transferring comprises adjusting the rate at which calls are transferred.

41. The computer readable storage medium of claim 39, wherein presenting a call comprises displaying call interaction options, corresponding to each transferred call, to a viewer.

42. The computer readable storage medium of claim 41, wherein the call interaction options for simultaneous transferred calls are presented to separate and distinct locations on the viewer.

43. The computer readable storage medium of claim 41, wherein the call interaction options are displayed to locations based upon the order in which transferred calls are received by the agent.

44. The computer readable storage medium of claim 41, wherein call interaction options for playing scripts to a called party are highlighted when a person associated with the transferred call is audible.

45. The computer readable storage medium of claim 39, wherein presenting a transferred call comprises playing an audible portion of the transferred call to a speaker.

46. The computer readable storage medium of claim 45, wherein respective audible portions of simultaneous transferred calls are played to separate and distinct speakers.

47. The computer readable storage medium of claim 45, wherein an audible portion of a transferred call is played to a speaker based upon the order in which the audible portions of the transferred calls are received by the agent.

48. The computer readable storage medium of claim 39, wherein the call is inaudible to the agent unless a voice associated with the transferred call is audible.

49. The computer readable storage medium of claim 39, wherein the instructions further comprise an operation to display the progress of transferred calls to an agent.

50. The computer readable storage medium of claim 49, wherein the instructions further comprise an operation to display the progress of calls to the agent by identifying when the calls will be highlighted.

51. The computer readable storage medium of claim 39, wherein the instructions further comprise an operation to control the rate of transferred calls by playing scripts of variable length before transferring the call.

52. The computer readable storage medium of claim 39, wherein the instructions further comprise an operation to automatically disposition the call based on one or more predetermined call statuses.

53. The computer readable storage medium of claim 39, wherein the instructions further comprise an operation to interact with the call.

54. The computer readable storage medium of claim 39, wherein interacting with the call comprises allowing an agent to select and play one or more prerecorded scripts.

55. The computer readable storage medium of claim 53, wherein interacting with the call comprises allowing an agent to speak in live voice to the person called.

56. The computer readable storage medium of claim 39, wherein the instructions further comprise an operation to track each transferred call.

57. The apparatus of claim 1, wherein the selective display of call interaction options to the viewer corresponds to an event comprising at least one of a status of the call, the playing of an audio file, and a sound from the called person.

58. The system of claim 18, wherein the selective display of call interaction options to the viewer corresponds to an event comprising at least one of a status of the call, the playing of an audio file, and a sound from the called person.

59. The method of claim 23, wherein the selective display of call interaction options to the viewer corresponds to an event comprising at least one of a status of the call, the playing of an audio file, and a sound from the called person.

60. The computer readable medium of claim 39, wherein the selective display of call interaction options to the viewer corresponds to an event comprising at least one of a status of the call, the playing of an audio file, and a sound from the called person.

* * * * *